United States Patent Office 3,425,993
Patented Feb. 4, 1969

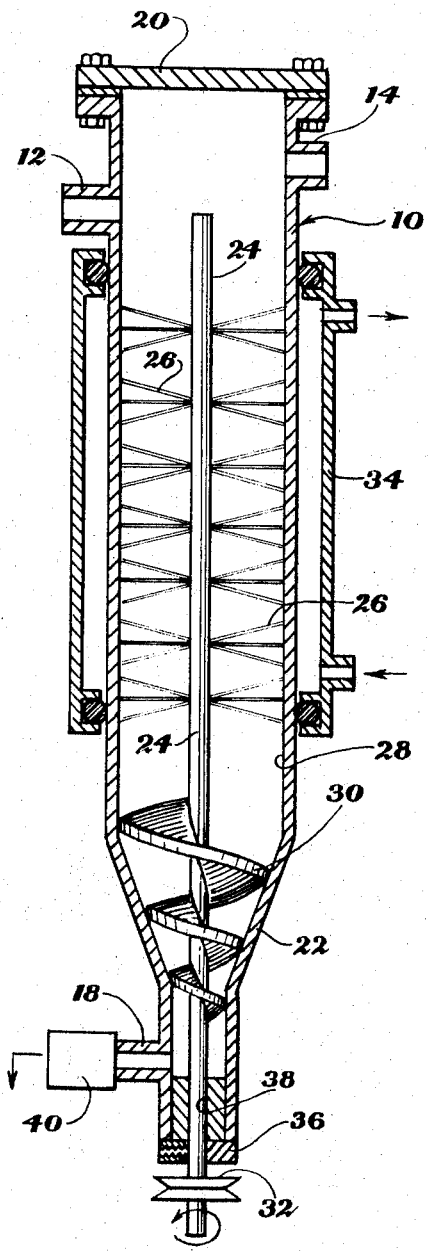
Edmond S. Perry
INVENTOR.

3,425,993
METHOD FOR PRODUCING AND PROCESSING VISCOUS MATERIALS SUCH AS POLYMERS
Edmond S. Perry, Rochester, N.Y., assignor to Eastman Kodak Company, Rochester, N.Y., a corporation of New Jersey
Filed Aug. 16, 1962, Ser. No. 217,381
U.S. Cl. 260—75
Int. Cl. C08j 1/32; C08g 17/003
4 Claims

ABSTRACT OF THE DISCLOSURE

Improvements in the control of chemical reactions that are subject to internal non-uniformities during the reaction (for example, condensation polymerization reactions involving viscous polymers) can be obtained by use of a process involving:
 (a) Applying the reactant in a layer to a cylindrical surface, and
 (b) Efficiently agitating the resulting layer by means of the ends of flexible "fingers" on a shaft coaxial to the inner cylindrical surface; the "fingers" penetrating the layer of reactant and sliding in continuous contact with the cylindrical surface.

---

This invention relates to an improved method and apparatus for the production and further processing of viscous materials, particularly polymers.

In the production of polymeric materials by either condensation or addition polymerization of dimeric, trimeric or other low molecular weight reactants which may be termed monomers, and in the halogenations and other reactions of polymeric or other viscous materials such as long chain hydrocarbons, a great number of chemical reactions simultaneously occur. However, the rates and extents of these reactions should be carefully controlled where uniformity in molecular weight, viscosity, color or other physical and chemical properties is required in the final product.

A partial answer to this problem of reaction control is the continuous reactor (polymerizer in the case of polymers) which receives a continuous feed of reactants and produces a continuous exhaust of product. Even with these reactors, however, the desired uniformity of product is adversely affected by conditions such as the following:
 (1) Differences in temperature of various portions of the reacting layer,
 (2) Uneven mixing of the reactants,
 (3) Lack of true temperature control,
 (4) Non-uniformity of the reaction system, and
 (5) Non-uniformity of the time of reaction.

These conditions and their effects shall hereinafter be explained in detail.

The main objects of the invention are: to prevent the establishment of reaction conditions which adversely affect uniformity of chemical reaction products; to increase the output rate of continuous polymerization reactors by simple and inexpensive means; and to provide an efficient method and means for obtaining polymer products of uniformly high viscosities.

In accordance with the present invention, these objects are achieved, in a broad sense, by continuously and thoroughly agitating a relatively thin layer of reacting materials as the layer moves along a heated surface. As will hereinafter become evident, both the type of agitation and the agitating means represent novel and successful approaches to well recognized reaction problems.

Further objects, advantages and novel features of the invention will become apparent from the following description and drawing wherein the single figure is a longitudinal sectional view of the reactor with portions shown in elevation.

Referring to the drawing, the reactor comprises a body 10 which may conveniently be constructed of one or more removable sections, and having a reactant inlet port 12, a vacuum port 14, a product outlet port 18, a sealing end cap 20, and a densifying portion 22. Other forms of reactors may, of course, employ the agitator of, and be operated in accordance with the present invention. For example, in chlorination reactions, it might be advisable to locate a chlorine inlet (not shown) in the lower portion of wall 28 and cause the chlorine to continuously circulate out through port 14, back into a chlorine source connected to port 14 and hence back into said chlorine inlet.

The agitator comprises a shaft 24 to which bristles 26, hereinafter referred to as fingers, are secured as shown, for example, in Patent 2,539,699. These fingers are sufficiently long and flexible to bear against the cylindrical surface 28 of the reactor as shaft 24 is rotated. A conical screw densifier 30 may be formed on shaft 24 which is provided with a pulley 32 adapted to be driven in a direction causing densifier 30 to compact or densify the product at the bottom of the reactor and force it out through port 18. Prior to densification, a product such as polyethylene terephthalate is quite foamy as a result of the rapid evolution of volatile by-product and the agitating action of the fingers. A heating system such as hot oil jacket 34, or the electrical heating unit shown in FIG. 2 of Patent 2,539,699 surrounds the reactor body to provide the heat necessary for the reactions.

In the operation of vertical reactors, in general, the reactants, which may be prepolymers (see U.S. 2,465,319, U.S. 2,727,882, U.S. 2,933,476, and U.S. 2,901,466 regarding the polyester prepolymers), are fed through an inlet port at a certain rate. As the reactants run down the inner wall of the reactor which is heated to a temperature sufficient to induce the reaction, the aforesaid conditions which impair the uniformity of the properties of the product and particularly its viscosity tend to become established. These conditions, which are listed above, numbered 1–5, are described below in detail and should serve to illustrate the advantages of employing the agitator according to the present invention.

CONDITION 1

This condition refers to the temperature difference between the inner and outer portions of the reacting layer. The magnitude of the temperature difference depends on several factors among which are:
 (a) The length of time that the reacting layer remains undisturbed during its travel down the reactor wall surface, and
 (b) The thickness of the reacting layer.

Where (a) and (b) are both relatively large, the maximum inherent viscosity will not likely be attained. This conclusion is supported by the data of Table I below which describes the results of polymerizing layers of various thicknesses of monomeric (which is sometimes called prepolymeric) polyethylene terephthalate under identical conditions and measuring the resulting viscosities. Each polymerization was performed without stirring, using lithium aluminum ethylate catalyst at 285° C. and a pressure of 0.3 mm. of Hg. for 0.5 hour.

Table I

| Thickness (mils) of reacting layer: | Inherent viscosity |
|---|---|
| 0–7 | 0.76 |
| 13–15 | 0.49 |
| 20–22 | 0.35 |

CONDITION 2

It is apparent that this condition leads to considerable irregularity in the rate and extent of reaction of the various portions of the reacting layer and prevents accurate estimating and controlling of viscosity and other properties of the product.

CONDITION 3

This condition refers to the tendency of the reacting layer to become non-uniformly heated whether due to its lack of agitation or its excessive thickness. In other words, the reactor heating system is not able to transmit heat rapidly and uniformly throughout the reacting layer and, in order to heat the innermost portions of the layer, must heat the reactor wall surface to a higher temperature than that which produces the highest viscosity. The result is the formation of hot spots adjacent the wall surface and cool spots adjacent the inner surface of the reacting layer. The adverse effects of this condition on achieving the desired maximum viscosity may be estimated from Table II below which relates the ultimate inherent viscosity to the polymerization temperature of four samples of polyester (polyethylene terephthalate), each of which were prepared under identical conditions except for the temperature differences.

Table II

| Polymerization | Inherent viscosity |
| --- | --- |
| 275° C | 0.37 |
| 285° C | 0.52 |
| 295° C | 0.66 |
| 305° C | 0.51 |

It is seen that maximum viscosities are achieved at about 295° C. while temperatures of 305° C. actually degrade the polymer and rapidly reduce its viscosity.

CONDITION 4

This condition refers to localized concentrations within the reacting layer of (a) heat, (b) reactants, (c) polymer and (d) volatile by-products. Some of the adverse effects of (a) and (b) on maximum viscosity attainment have been discussed. A significant adverse effect of (c) and (d) becomes apparent when the following equilibrium is considered:

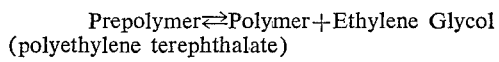

Prepolymer⇌Polymer+Ethylene Glycol
(polyethylene terephthalate)

It is apparent that localized high concentrations of the ethylene glycol by-product of the condensation polymerization will prevent maximum polymerization.

CONDITION 5

This condition refers to the variation in time which various portions of the reacting layer spend in the reacting zone. These variations are caused by irregularity in the flow rate of the reacting layer. Under such conditions, accurate polymerization and viscosity control are obviously rendered difficult if not impossible.

Another factor which increases the difficulty of accurately controlling the heat of the reacting layer is the incidental heat imparted to the layer by the action of the agitator. This heat becomes substantial when agitating very viscous materials with blade or paddle type agitators. Moreover, it is noted that these types of agitators frequently become heavily loaded with viscous polymer to introduce still another variable.

The present invention drastically reduces the tendency of these adverse conditions to become established by actually exerting continuous physical forces on the entire reacting layer by a multiplicity of fingers 26 which extend through the reacting layer and slidably engage the reactor wall surface 28. These fingers, during reactor operation, continuously agitate and turn over the entire reacting layer including those portions tending to adhere to the reactor wall at a relatively high frequency, to thereby prevent the establishment of significant temperature differences, to evenly and intimately mix the reactants, to cause sufficiently rapid transfer of heat to obviate the need for excessively high reactor wall surface temperatures, to eliminate significant inhomogeneity in the reacting layer, and to expose volatile by-products to the internal atmosphere which may be a vacuum. The diameters of the fingers and their preferably round cross-section produces negligible heat through agitation. Moreover, the centrifugal force on the polymer easily overcomes the capillary and adhesive forces tending to load the fingers, and thereby prevents the establishment of still another variable. It is noted that a plurality of such reactors may be connected in a series fashion to gradually build up product viscosity.

The number of fingers per unit drop in the reactor (finger density) at various positions in the reactor may be adjusted to further promote uniformity of reaction. Fox example, by increasing finger density near the top of the reactor, the effect of the progressively increasing viscosity of the reacting layer on the uniformity in drop rate of the layer can be minimized. Such control of drop rate insures a substantially uniform thickness of reacting layer, and by thus eliminating one variable, easier control of the other variables is made possible. Moreover, the fingers may be arranged in a spiral on shaft 24 to impart downward force on the reacting layer when the shaft is rotated in one direction, and upward force for reverse rotation of the shaft. Such flexibility in the manner of operation of the reactor further facilitates control of drop rate and attainment of a uniform product.

Densifier 30 is shown as integral with shaft 24, but, these elements may be separate, with the densifier driven through pulley 32, and shaft 24 extending through cap 20 and driven through a similar pulley. However, the arrangement as shown reduces the number of seals necessary. Other types of densifiers are known and could be installed in the reactor in place of densifier 30. Various collars such as 36 may be provided to control axial motion of the densifier. Also, bearing 38 may be sufficiently long to prevent cocking of shaft 24. In this regard, it is noted that the fingers themselves act as a bearing. A viscometer 40 may be connected to the product outlet 18 to indicate needed adjustments of such parameters as agitator speed, densifier speed, finger density, vacuum and reactor wall surface temperature.

In addition to the aforesaid adjustability characteristics, the sizes (diameters) of the fingers may be varied and selected according to their location in the reactor to compensate for very rapid viscosity increases. This could become important since the fingers must be sufficiently rigid to penetrate the reacting layer, regardless of its viscosity.

The materials from which the various parts of the apparatus are made should be such that frictional and chemical deterioration are held to a minimum according to good engineering practice. For example, for most purposes, stainless steel fingers perform satisfactorily and give lengthy service.

The invention has been described in detail with particular reference to preferred embodiments thereof, but it will be understood that variations and modifications can be effected within the spirit and scope of the invention as described hereinabove and as defined in the appended claims.

I claim:
1. A method of controlling chemical reactions comprising the steps of applying the reactants in a layer to a heated cylindrical surface, penetrating said layer and engaging said surface with the ends of a plurality of flexible fingers, and causing the ends of said fingers to slide in a circular manner around said surface and in continuous contact with said surface to thereby cause all portions of the reacting layer to turn over at a relatively high frequency.

2. A method of controlling chemical reactions in a continuous reactor comprising the steps of continuously applying the reactants in a layer to a heated cylindrical surface, penetrating said layer and engaging said surface with the ends of a plurality of flexible fingers, and causing the ends of said fingers to slide in a circular manner around said surface and in continuous contact with said surface to cause all portions of the reacting layer to turn over at a relatively high frequency.

3. A method of controlling polymerization reactions in a continuous reactor comprising the steps of continuously applying the reactants in a thin flowable layer to a substantially upright heated cylindrical surface, penetrating said layer and engaging said surface with the ends of a plurality of flexible fingers, and causing the ends of said fingers to slide in a circular manner around said surface and in continuous contact with said surface to cause all portions of the reacting layer to turn over at a relatively high frequency.

4. A method of controlling condensation polymerization reactions in a continuous reactor comprising the steps of continuously applying prepolymer in a thin flowable layer to a substantially upright heated cylindrical surface exposed to a vacuum source, penetrating said layer and engaging said surface with the ends of a plurality of flexible fingers, and causing the ends of said fingers to slide in a circular manner around said surface and in continuous contact with said surface to cause all portions of the reacting layer to turn over at a relatively high frequency to expose the condensation by-product to the vacuum almost simultaneously with the formation of said by-product.

References Cited

UNITED STATES PATENTS

| | | | |
|---|---|---|---|
| 2,395,079 | 2/1946 | Sparks et al. | 23—285 |
| 2,504,488 | 4/1950 | Antonio et al. | 23—285 |
| 2,758,105 | 8/1956 | Alles et al. | 260—75 |
| 2,904,534 | 9/1959 | Williams et al. | 260—75 |
| 2,539,699 | 1/1951 | Perry et al. | 203—72 |
| 2,964,391 | 12/1960 | Benson | 260—75 |
| 3,054,729 | 9/1962 | Smith | 203—89 X |
| 3,174,830 | 3/1965 | Watzl et al | 260—75 |

WILLIAM H. SHORT, *Primary Examiner.*

LOUISE P. QUAST, *Assistant Examiner.*

U.S. Cl. X.R.

23—285; 260—95, 684, 694, 695, 698